(12) United States Patent
Bateman et al.

(10) Patent No.: US 6,944,700 B2
(45) Date of Patent: Sep. 13, 2005

(54) METHOD AND SYSTEM FOR TRANSFERRING DATA BETWEEN A DIGITAL CAMERA AND A HOST

(75) Inventors: John Bateman, San Francisco, CA (US); Bryed Billerbeck, Mountain View, CA (US); John J. Feldis, III, Menlo Park, CA (US); Mark Jeffrey Johnson, Oakland, CA (US); Ali Moayer, Castro Valley, CA (US); George Sanchez, Fremont, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 389 days.

(21) Appl. No.: 09/882,533

(22) Filed: Jun. 15, 2001

(65) Prior Publication Data

US 2002/0194414 A1 Dec. 19, 2002

(51) Int. Cl.⁷ .............................................. G06F 13/00
(52) U.S. Cl. ...................................... 710/300; 348/375
(58) Field of Search ................................ 710/300, 301, 710/302, 303, 304; 348/148.04

(56) References Cited

U.S. PATENT DOCUMENTS

| | | | |
|---|---|---|---|
| 5,016,107 A | | 5/1991 | Sasson et al. |
| 5,475,441 A | * | 12/1995 | Parulski et al. ............. 348/552 |
| 5,477,264 A | | 12/1995 | Sarbadhikari et al. |
| 6,005,613 A | * | 12/1999 | Endsley et al. .......... 348/231.6 |
| 6,147,469 A | | 11/2000 | Uchida et al. |
| 6,275,882 B1 | * | 8/2001 | Cheever et al. ............. 710/302 |
| 6,298,395 B1 | * | 10/2001 | Kurase ......................... 710/15 |
| 6,324,605 B1 | * | 11/2001 | Rafferty et al. ............. 710/100 |
| 6,657,654 B2 | * | 12/2003 | Narayanaswami ....... 348/14.04 |
| 2001/0019359 A1 | | 9/2001 | Parulski et al. |
| 2002/0186319 A1 | * | 12/2002 | Whitby et al. .............. 348/375 |

* cited by examiner

Primary Examiner—Tim Vo
(74) Attorney, Agent, or Firm—Townsend and Townsend and Crew LLP

(57) ABSTRACT

A system and a method for the transfer of data between a digital camera and a host using a novel combination of hardware and software related elements. An aspect of the hardware-related elements provides a camera base unit which remains connected with the host, and which the camera is connected with to facilitate the transfer of data to the host. The camera base unit significantly simplifies the connection between the camera and the host by alleviating the need to directly connect the camera with a host. Furthermore, the camera base unit, by providing a pass-through connection and placement guides that mate with the camera, assures that an intuitive placement of the camera on the camera base unit also enables an electronic connection between the camera and the host. Therefore, the simple placement of the camera in contact with the camera base unit ensures a proper interface between the camera and the host, which is connected with the camera base unit. Another aspect of the hardware-based elements is directed towards a "quick send" button. Pushing the "quick send" button causes all the selected on-camera data to be transferred to a local or remote host. The transfer of data is caused by a series of software operations which are initiated in response to the camera connecting with the camera base unit, and which are performed either automatically or following the pushing of the "quick send" button.

27 Claims, 7 Drawing Sheets

METHOD AND SYSTEM FOR TRANSFERRING DATA BETWEEN A DIGITAL CAMERA AND A HOST

BACKGROUND OF THE INVENTION

The present invention relates to digital cameras. More particularly, the present invention is directed towards methods and systems for the transfer of image data from a digital still camera to an intelligent host such as a personal computer.

Digital still cameras typically use an image sensor to capture an image of a scene and use electronic memory devices to store the captured images as image files on the camera. Digital still cameras are commercially available from many manufacturers as either stand alone digital still cameras or as a feature on digital video cameras. Digital still cameras are also available as a feature of dual-purpose cameras. Dual-purpose cameras, when connected with an intelligent host such a personal computer function as Internet video cameras, which are also know as web cams. When detached from the intelligent host, the dual-purpose camera functions as a digital still camera. The camera's control panel allows its operator to snap, save and delete pictures.

An essential factor to the commercial success of digital cameras is their ease of use. An essential aspect of the ease of use of a digital camera is the ease of transferring image data from the camera to a host. Typical dual-purpose cameras, rely on a connection, such as a USB connection, to transfer images, captured in their still camera mode, from the camera's memory to the host. Most consumers do not, on a regular basis, repeatedly connect, disconnect and reconnect a device such as a digital camera with their personal computers, and hence may find this aspect of the use of a digital camera rather cumbersome. Moreover, once a connection between a camera and its host has been established, the operator must maneuver through various menus of an application program to select, preview and transfer image data from the camera to its host. Presently, both the connection and data transfer operations are at best difficult to maneuver.

Some have provided improvements in the areas of data transfer from a digital camera. One such improvement is described in U.S. Pat. No. 6,167,469, entitled "Digital Camera Having Display Device for Displaying Graphical Representation of User Input and Method for Transporting the Selected Images Thereof." The '469 patent provides a method and apparatus for the transfer of image data directly to a communication network without requiring the camera to be interfaced with a local host computer. The method of the '469 patent relies on an executable program resident on the camera to send image data from the camera to a destination over a communication network. The motivation for the '469 patent appears to be that many who own digital cameras may not own or may not have access to a local host computer to transfer their camera's image data to a destination. Thus the '469 patent requires the camera device to have the necessary hardware, firmware and software to achieve the data transfer operation. Such requirements generally tend to add complexity and cost to the camera device itself, which may impede the proliferation of such devices. Further, many who use digital cameras, also wish to edit the captured images on their local computers, and thus require a transfer of image data from a camera to a host. Clearly, the method of the '469 patent does not address this need.

Another device that has gained popularity for interfacing a peripheral device with a local host is the device commonly referred to as a cradle or a docking station. While cradles or docking stations are commonly used with many peripheral devices, their implementation in conjunction with digital cameras and especially dual mode digital cameras has not been pursued as vigorously by the digital camera community. Further, both the approach of the '469 patent and the use of the cradle device do not address the need for a rapid transfer of camera's data to a local host.

There is therefore a need to improve the connection and data transfer operations between a digital camera and its host. And further, it is likely that cameras that are easily connectable to a host and those that can simply and quickly transfer their data to a host, will also be ones most adopted by consumers, and thus lead to commercial successes for their manufacturers.

SUMMARY OF THE INVENTION

The present invention provides a method and a system for the transfer of data between a digital camera and a host using a novel combination of hardware and software-based elements. More specifically, the digital camera of the present invention is a dual mode digital camera where the camera, when connected with an intelligent host such as a personal computer, functions as an Internet video cameras, and when detached from the intelligent host, the dual-purpose camera functions as a digital still camera.

An aspect of the hardware-based elements is directed towards providing a camera base unit which remains connected with the host, and which the camera is connected with to facilitate the transfer of data to the host. The connection between the camera base unit and the host includes both tethered and wireless connections; where in the wireless case, the base unit is capable of wirelessly transmitting to and receiving data from the intelligent host. The camera base unit significantly simplifies the connection between the camera and the host by alleviating the need to directly connect the camera with a host. Furthermore, the camera base unit, by providing a pass-through connection and placement guides that mate with the camera, assures that an intuitive placement of the camera on the camera base unit also enables an electronic connection between the camera and the host. Therefore, the simple placement of the camera in contact with the camera base unit ensures a proper interface between the camera and the host, which is connected with the camera base unit.

Another aspect of the hardware-based elements is directed towards a "quick send" button. Pushing the "quick send" button causes all the selected on-camera data to be transferred to a local host. The transfer of data is caused by a series of software operations which are initiated in response to the camera connecting with the camera base unit, and which are either performed automatically after connecting the camera with the base unit or are performed following the pushing of the "quick send" button.

Another aspect of the system and method of the present invention is that the camera and/or the base unit are enabled to provide a visual and/or audible indication of the establishment of a proper interface between the camera and the host. The audible indication includes the output of a "beep" tone. In some embodiments, the visual indication includes the activation of a light emitting diode (LED) near the "quick send" button. Thus, an illumined "quick send" button indicates to an operator that the camera is properly interfaced with the host and is ready to transfer its data thereto.

Yet another aspect of the system and method of the present invention is that the on-camera and on-host software allow for a bi-directional communication, which enables the flow of data from the local or remote host back to the camera. This backward flow of data allows for the camera to be uploaded with the most current list of file directory locations, web folder locations, instant messenger IDs and/ or addresses, or more generally Universal Resource Locators (URLs), for the transfer of data out of the camera, so that the camera and the operator are enabled to choose from options, which were not previously available on the camera. Further, the backward flow of data allows for the transfer of image data to the camera, thus allowing a camera to serve as a digital picture frame.

These and other embodiments of the present invention, as well as its advantages and features, are described in more detail in conjunction with the description below and attached figures.

DESCRIPTION OF THE SPECIFIC EMBODIMENTS

Embodiments of the present invention are directed to methods and systems for the transfer of data from a peripheral device to a local or a remote intelligent host. More specifically, the peripheral device includes a digital camera, where the digital camera may be a stand-alone digital camera or a dual mode digital camera and the data comprises digital image data that is stored on the camera. Furthermore, data stored on the camera can include audio in addition to image data. As used herein, digital image data includes both digital still and video image data. A dual mode digital camera is a digital camera that operates in at least two modes, where in a first mode, the camera is a stand alone digital still camera, and in a second mode, the camera is a digital still or video camera, which is also commonly known as an Internet video camera or a web cam. The local or remote intelligent host is most commonly a personal computer. However, since advancements in technology are blurring the boundaries between computing and communication devices, an intelligent host as used herein is meant to include other examples of any host having a processor, memory, means for input and output, and means for storage. Other examples of intelligent hosts, which are also equally qualified to be used in conjunction with embodiments of the present invention include a handheld computer, an interactive set-top box, a thin client computing device, a personal access device, a cellular or wireless telephone, an internet appliance and an internet connected digital picture frame.

Figure 1:
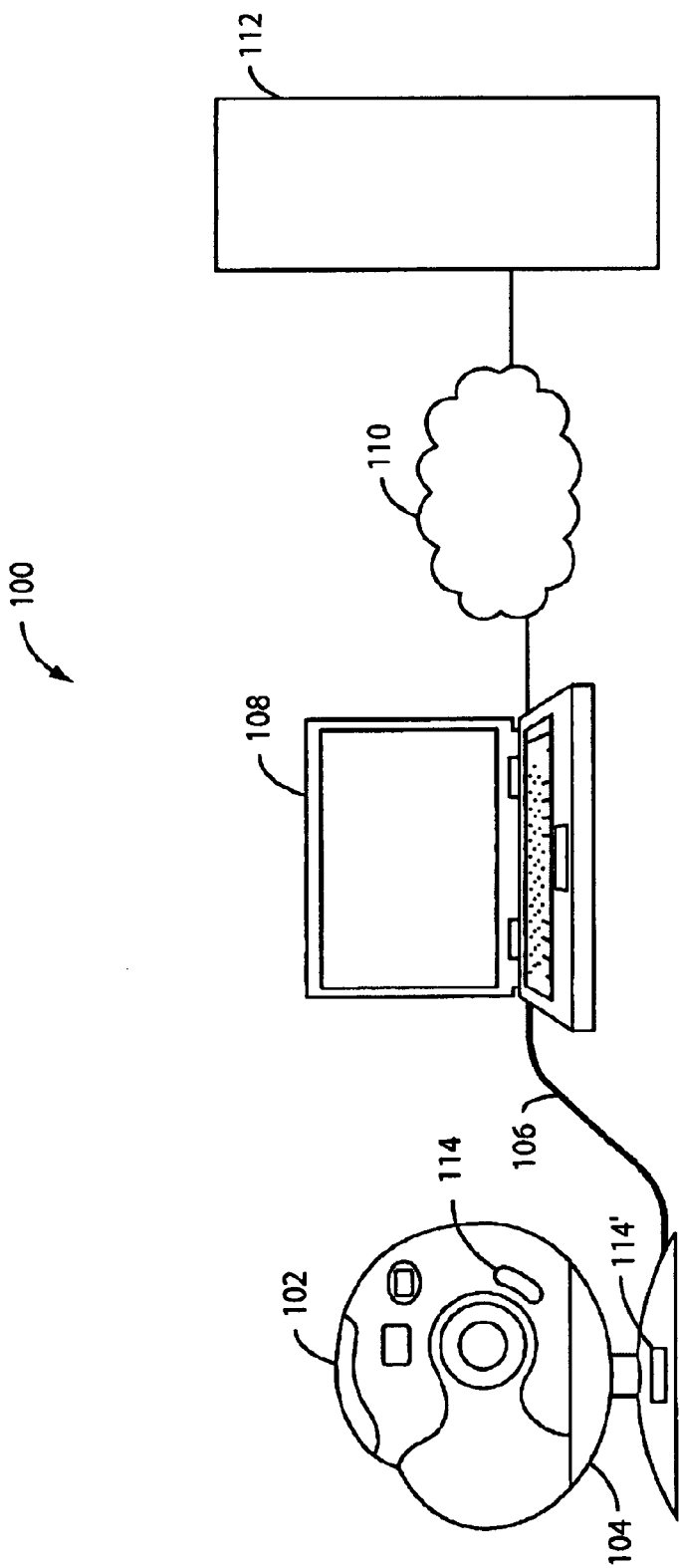
FIG. 1 is a block diagram of a system for the transfer of data between a peripheral and an intelligent host according to an embodiment of the present invention.

FIG. 1 is a top-level block diagram of a system 100 configured to transfer data between a peripheral device 102 and an intelligent host 108 according to an embodiment of the present invention. The peripheral device 102 is a dual mode digital camera connected to a base or a cradle 104. The cradle 104 is connected to a local intelligent host 108 via a connection 106 through an external bus such as a Universal Serial Bus (USB). The connection between the camera base unit and the host includes both tethered and wireless connections; where in the wireless case, the base unit is capable of wirelessly transmitting to and receiving data from the intelligent host. Furthermore, the local intelligent host 108 may be connected via an Internet connection 110 to a remote intelligent host 112. The remote host 112 can also be a remote file server hosting a web site.

Image data captured by the camera 102 is selected and various actions are assigned to each selected image by an operator of the camera. The image selection and action assignment operations, which are described below, include selecting an image to be transferred to a host and selecting an image to be further processed by a host, where further processing by a host can include printing a selected image or forwarding a selected image to a remote host, or an electronic mail recipient. The capturing of images and the image selection and action assignment operations are carried out by an operator of the camera in its digital still mode, while it is disconnected from the cradle 104. The operator captures images, selects images and assigns actions to the selected images using on-camera software programs which are configured to carry out these operations and which receive input from various push buttons on the camera, which are activated by the camera operator. The on-camera software is further enabled to be configured by the user to designate that all subsequently captured images are to be automatically assigned actions to be carried out when the camera is interfaced with the host.

On-camera and on-host software programs enable the transfer of selected image data from the camera 102 to the local host 108 or the remote host 112. In some embodiments the transfer of data from the camera 102 to the local host 108 or the remote host 112 is initiated in response to an operator pressing a button 114 on the camera 102, or alternately the button 114' on the cradle 104. Alternately, the image transfer is initiated automatically after an interface between the camera and the host is recognized by the camera. Yet alternately, the image transfer is initiated, without user intervention, by the application software running on a local or remote host. In addition, the user may initiate the transfer by clicking a button in the application software. As used herein, the button 114 (or 114') is referred to as the "quick send" button, since once the button is activated all the data selected for transfer out of the camera is send to the host without requiring any further input from the camera operator. The on-camera and on-host software operations as well as the image selection and action assignment are described in more detail below.

However, as a brief introduction, image selection includes selecting captured images which are to be transferred to the local host 108 once the operator engages the "quick send" button 114 (or 114'). Further, action assignment includes assigning particular actions to the selected images that will be carried out by the host once the image data has been transferred to the host. Examples of particular actions include the sending of the image data to particular directory locations residing on a local 108 or a remote host 112 and/or electronically mailing the image data to selected recipients, as well as those described above.

The advantage of on-camera image and action selection is that once the camera is connected to the cradle, the operator by pushing one button (the "quick send" button) transfers all the selected images to the local host. This one-button operation provides a significant improvement over the current method of transferring data from a camera to a host, which typically includes starting up a host application program and maneuvering through various menus to preview the on-camera data and then pulling the data from the camera to the host. Furthermore, the advantage of the camera base or cradle is that it provides for a very easy, operator-friendly and improved method of connecting the camera to the host. Placing the camera on the base unit, alleviates the need to use a cable to connect the camera to the host, as is done with other digital still cameras and which may require restarting the local host to recognize the newly connected camera. Thus the method and system of the present invention improve the operability and reduce the time needed to connect a camera to a host. Embodiments of the present invention improve the operability of transferring data from a digital still camera to a host by simplifying the connection of a camera to a host by using a base unit (cradle) and also by simplifying the data transfer by using the 1-button "quick send" feature. The use of the base unit and the 1-button "quick send" feature not only improve the usability of the digital still camera, but also reduce the time needed to connect the camera to the host and transfer image and audio data from a camera to a host.

Figure 2:
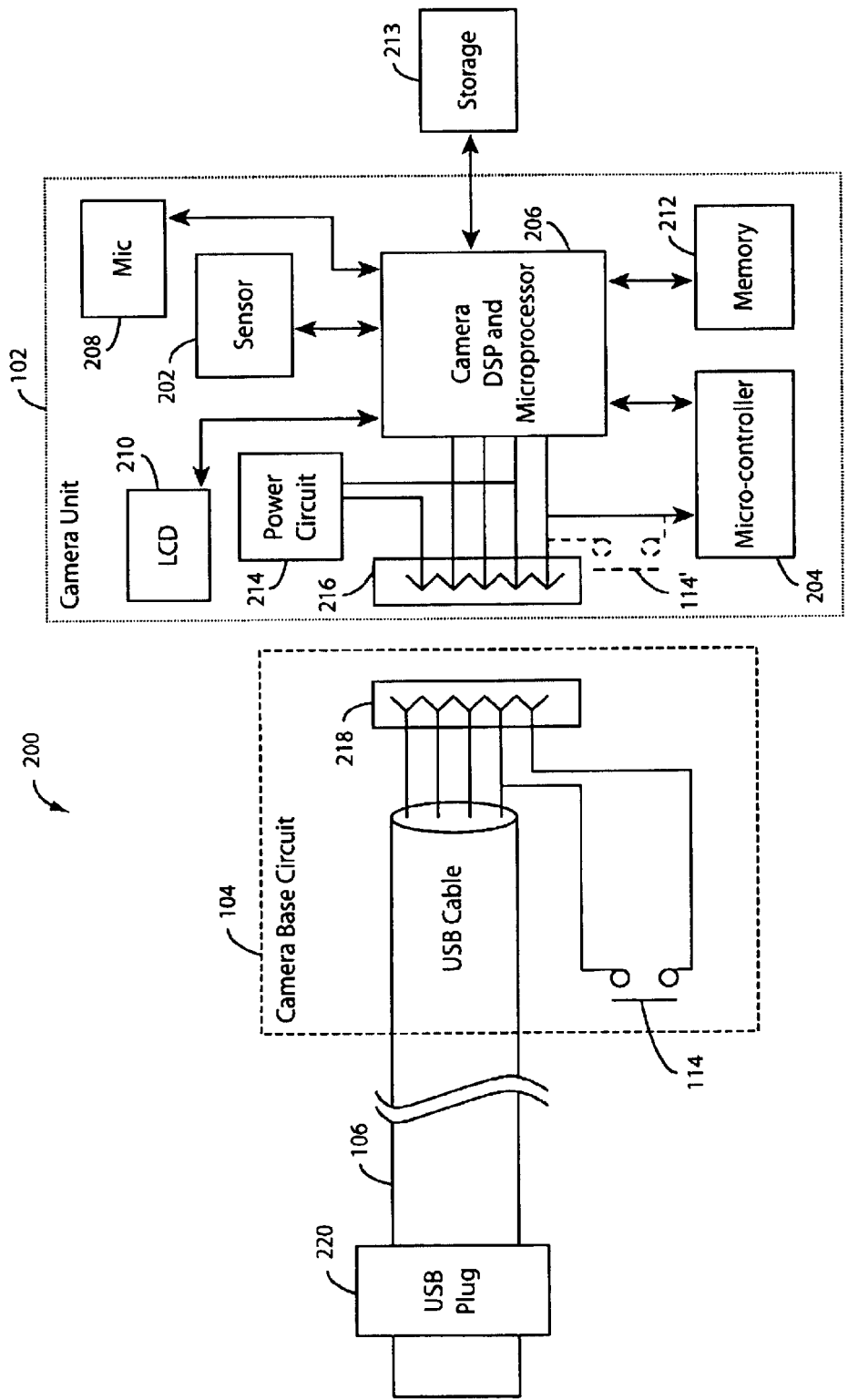
FIG. 2 is a block diagram showing an embodiment of the camera unit and camera base unit showing the "quick send" button.

FIG. 2 is a block diagram 200 showing an embodiment of the camera unit 102 and camera base unit or cradle 104 showing the "quick send" button 114 located on the camera base unit (cradle) 104. Alternately, the "quick send" button 114' may be located on the camera unit 102. The camera unit includes an image sensor 202 such as a charge-coupled device (CCD) image sensor for capturing an image of a scene. The camera unit 102 also includes a microcontroller 204 for processing an operator's push-button inputs (not shown). The push-button input operations include, but are not limited to operations for turning the camera on and or off, capturing an image, selecting a captured image for transfer to the host, deleting an image and assigning various actions to the selected images. The microcontroller 204 communicates with a camera digital signal processor and microprocessor 206. The microprocessor 206 is also in communication with the sensor 202 and a microphone 208 and a liquid crystal display 210. Images and sound captured by the sensor 202 and microphone 208 are stored in memory 212. The memory 212 is a fixed memory such as an EEPROM. Alternately, a removable memory 213 such as a removable memory card is used to store image and audio data. A power circuit 214 provides the necessary power for the proper operation of the camera.

A connection 216 on the camera unit 102 provides for connecting the camera to a host. In one embodiment, the camera connection 216 is a mini USB jack configured to receive a mini USB plug 218 located on the camera base unit 104. Plug 218 is connected with a connection 106 and terminates at a USB plug 220, which is connectable with a host. An operator depressing the "quick send" button 114 (or 114') will initiate the transfer of data from the memory 212 or 213 to a host. In this embodiment, the camera base unit 104 serves as pass through device for a USB cable connection between a host and the camera 102.

Figure 3:
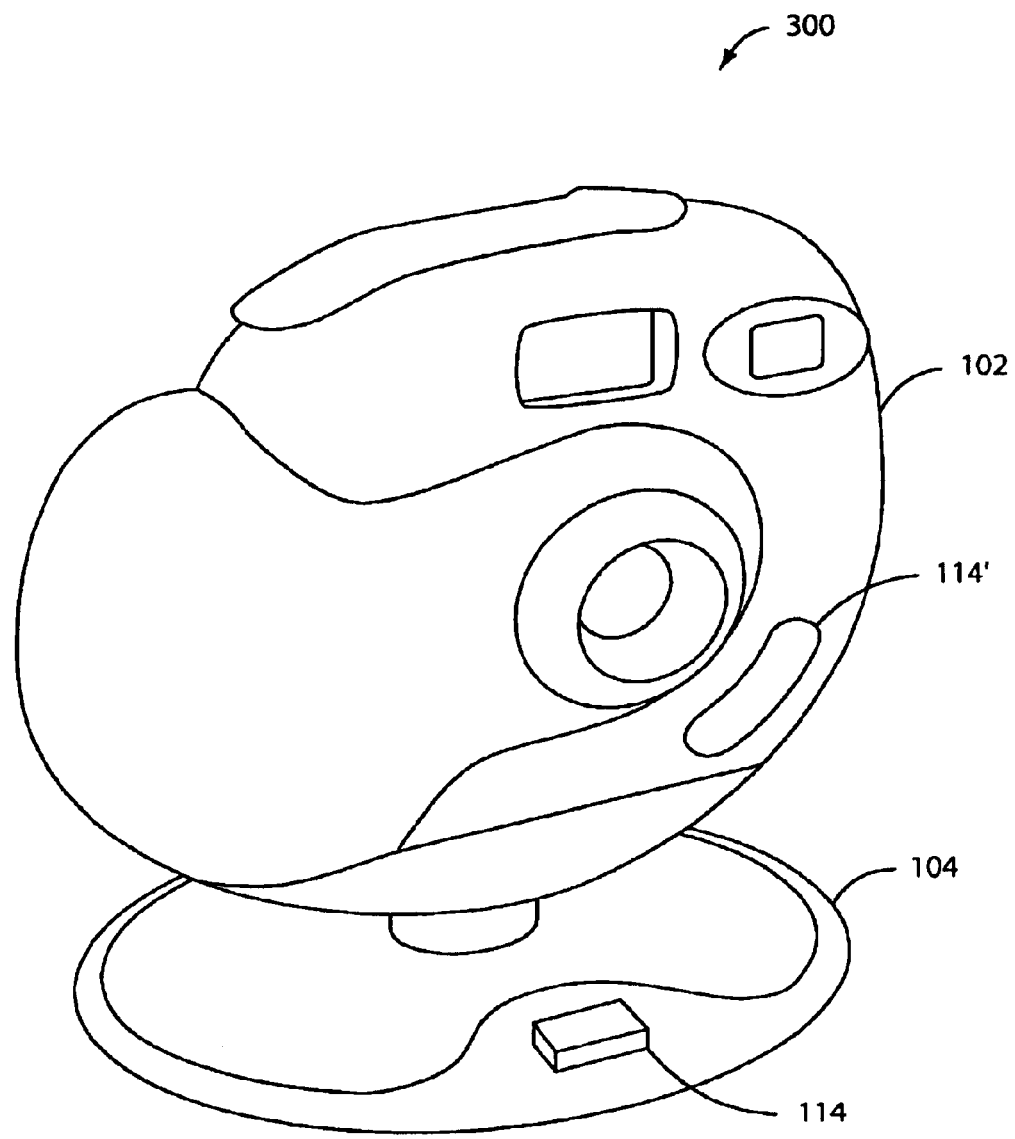
FIG. 3 is a diagram of the camera unit and the camera bases unit showing the camera connected with the base unit.

FIG. 3 is a diagram 300 of an embodiment of the camera unit 102 connected to the camera base unit 104 with the "quick send" button 114 on the camera base unit 104. Alternately, the "quick send" button 114' may be located on the camera unit 102. In some embodiments, an LED (not shown) illuminates the "quick send" button once a connection between the camera and the host is recognized by the camera. The illumined "quick send" button indicates to the operator that the camera is properly interfaced with the host and ready to initiate a transfer of data to the host. Alternately, the indication of a proper interface between the camera and the base is provided by an audible tone.

Figure 4:
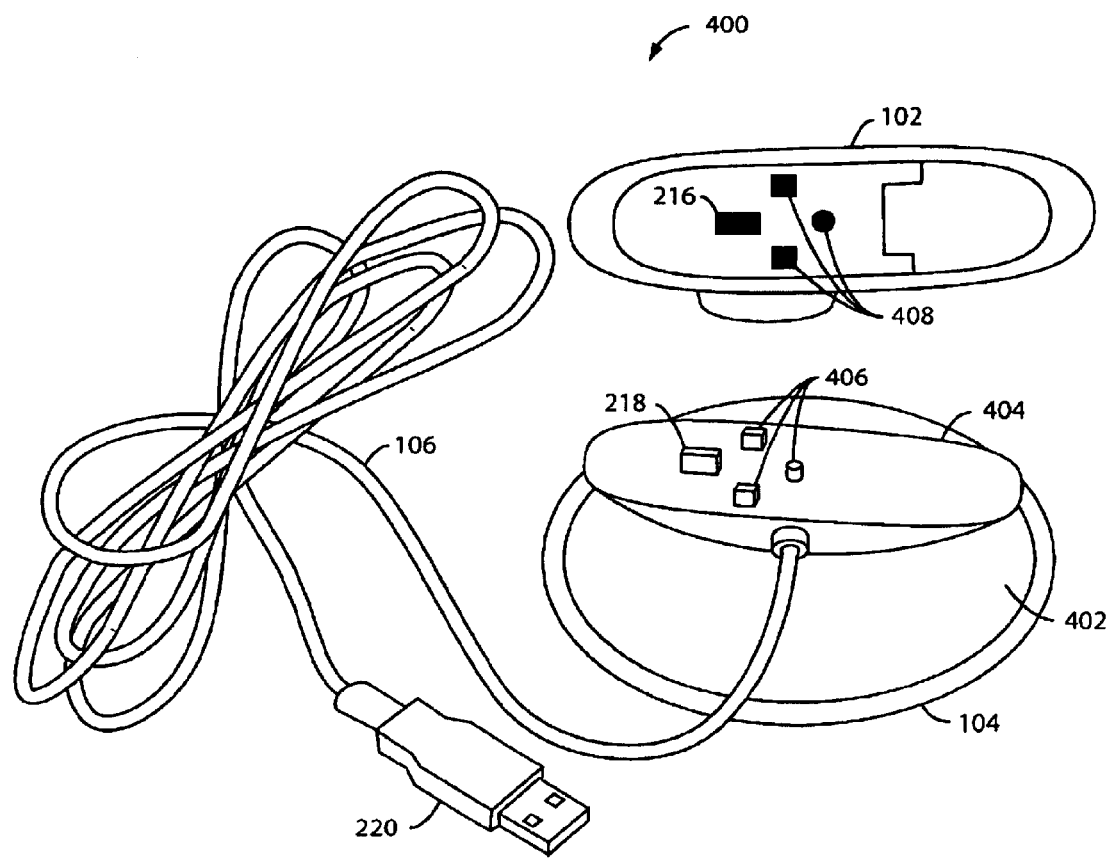
FIG. 4 is a diagram of the camera unit and the camera base unit.

FIG. 4 is a diagram 400 showing a physical arrangement of an embodiment of the camera unit 102 and the camera base unit 104. This figure (FIG. 4) also shows an embodiment of the physical configuration of the camera base unit 104 and its connection with the cable 106 for connecting the camera 102 to the host. As can be seen from this figure (FIG. 4), the base unit 104 has a base 402 and a pedestal 404, which is connected to the base 402. In some embodiments, the pedestal 404 is rotatably connected to the base 402 so as to allow for the pedestal to rotate with respect to the base 402. The rotation of the pedestal 404 with respect to the base 402 is especially useful when the camera is being operated in its web cam mode, since it will allow the camera to be easily turned to point at different directions. The base 402 and the pedestal 404 are manufactured using plastic materials, which are easy to manufacture at a low cost. The base is chosen to have the sufficient weight and/or size such that the camera 102 and the base unit 104 combination is stable when the camera 102 is placed on the base unit 104. In some embodiments, to help position the camera 102 properly on the base unit 104, a plurality of bosses 406 are molded integrally with the pedestal 404 which protrude from the pedestal 404 and which mate with matching depressions 408 on the bottom of the camera unit.

The base unit 104 has openings in its body to allow for a cable 106 to be fed therethrough. In some embodiments, the cable 106 terminates at a mini USB plug 218 at its near end and a standard USB plus at its far end 220. The USB plug 220 is used to connect the base unit 104 with a host. Once the camera unit 102 is placed on the base unit 104, bosses 406 are mated with depressions 408 to, in a stable manner, hold the camera 102 in contact with the base unit 104. Also the bosses 406 and the depressions 408 will guide the operator to properly connect the mini USB plug 218 with the mini USB jack 216.

During the normal usage of the camera in its digital still mode, the camera is not connected to the base while the base unit is preferably connected with the host. Once the operator desires to transfer stored data from the camera to the host, the operator simply places the camera 102 on the base unit 104. The user is intuitively guided to a correct placement since the bosses 406 and depressions 408 only allow for a single and proper arrangement for the placement of the camera unit on the base unit. The placement guidance mechanism provided by the bosses 406 and the depressions 408 will also assure a proper connection between the plug 218 and the jack 216. Once the camera 102 is placed in contact with the base unit 104, the user is ready to power up the camera. The powering up of the camera will initiate a sequence of operations which will lead to the camera's recognition of an interface with the host, which will in turn result in the camera providing an audio or visual indication (e.g. activating and LED on the "quick send" button) that the camera is ready to transfer data to the host. This sequence of operations is carried out primarily in response to a combination of operator actions and software operations. The operator actions include image selection and action assignments as described above, which are performed by the operator using the camera in its stand-alone digital camera mode. Some of the software operations are carried out by the on-camera software, and which include operations for selecting images and/or assigning actions. And some other portions of the software operations are carried out by host-resident software, and which include operations for the transfer of data between the host and the camera. The operator actions and software operations are described below in conjunction with FIGS. 5 through 7.

Figure 5:
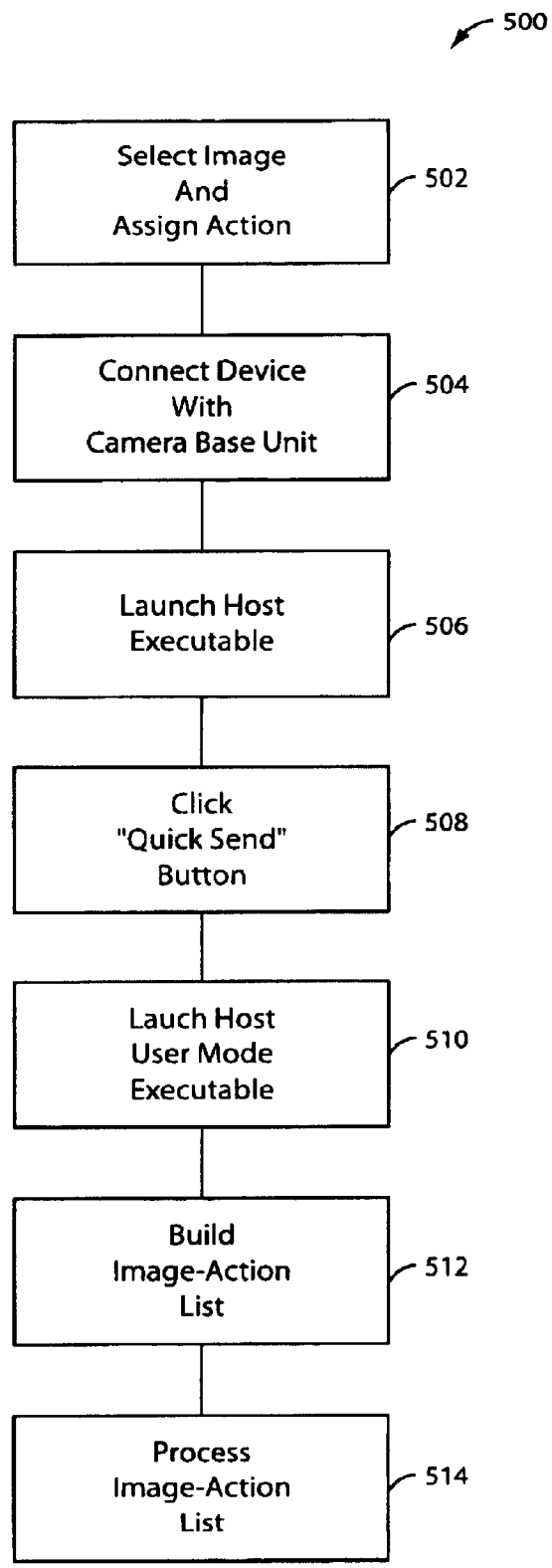
FIG. 5 is a flow diagram of an embodiment of the method of the present invention for the transfer of data from a digital camera to a host.

FIG. 5 is a flow diagram 500 of an embodiment of the method of the present invention for transferring data from a digital camera to a host. In one embodiment, the method of FIG. 5 describes a mode of operation of a system where an operator has previously installed various programs on the host through an application install operation. This application install operation installs software programs which include at least (a) an executable program for passing hardware events, such as connecting a camera to the base unit or a camera-initiated button click, to a host-resident user executable, where the host-resident user executable is configured to transfer image data between the camera and the host, (b) camera device drivers and (c) information files as necessitated by the operating system of a particular host which typically specify the files that are required to be present or downloaded for use by the operating system's setup component.

As an aid to description, the sequence of operations provided below are described in the context of digital camera which has been connected to an intelligent host, through a USB connection, running a common operating system such as the Windows™ series of operating systems. This particular hardware and software configuration is for description purposes only and is not to be limiting of the scope of the embodiments of the present invention. The embodiments of the present invention may be practiced on numerous implementations of various hosts, communications ports/busses and operating systems.

In step 502, the operator selects an image that has been previously captured by the camera and assigns a particular action to the selected image. The image selection and action assignments are carried out using on-camera push buttons in conjunction with the on-camera LCD and various LCD option screens. For example, the operator previews a captured image using the camera LCD, and selects it to be sent to a particular file directory location on the local or the remote host. A list of file directory locations that has been previously transferred and stored on the camera memory (during an initial connection to the host, most typically done during the initial install operation), is presented to the operator on the camera LCD, for the operator to select from using various push button operations. Default file directory locations can be pre-selected, thus not requiring a selection of a particular directory location by the operator. Alternately, and/or by default the entire collection of previously captured images can be selected for transfer to a host, thus bypassing the individual image selection operation. In addition to selecting a particular directory location, the operator may specify an address for file transfer where, for example, the address is a recipient's electronic mail (Email) address, which in some embodiments is selected from a pre-stored list. A previously stored list of addresses is also loaded in the camera memory in a manner similar to the list of stored file directory locations described above. Other data that may also be associated with a selected image may include a web page property information (e.g. account and authentication information) in case the user is selecting an image to be sent to a remote host.

Figure 6:
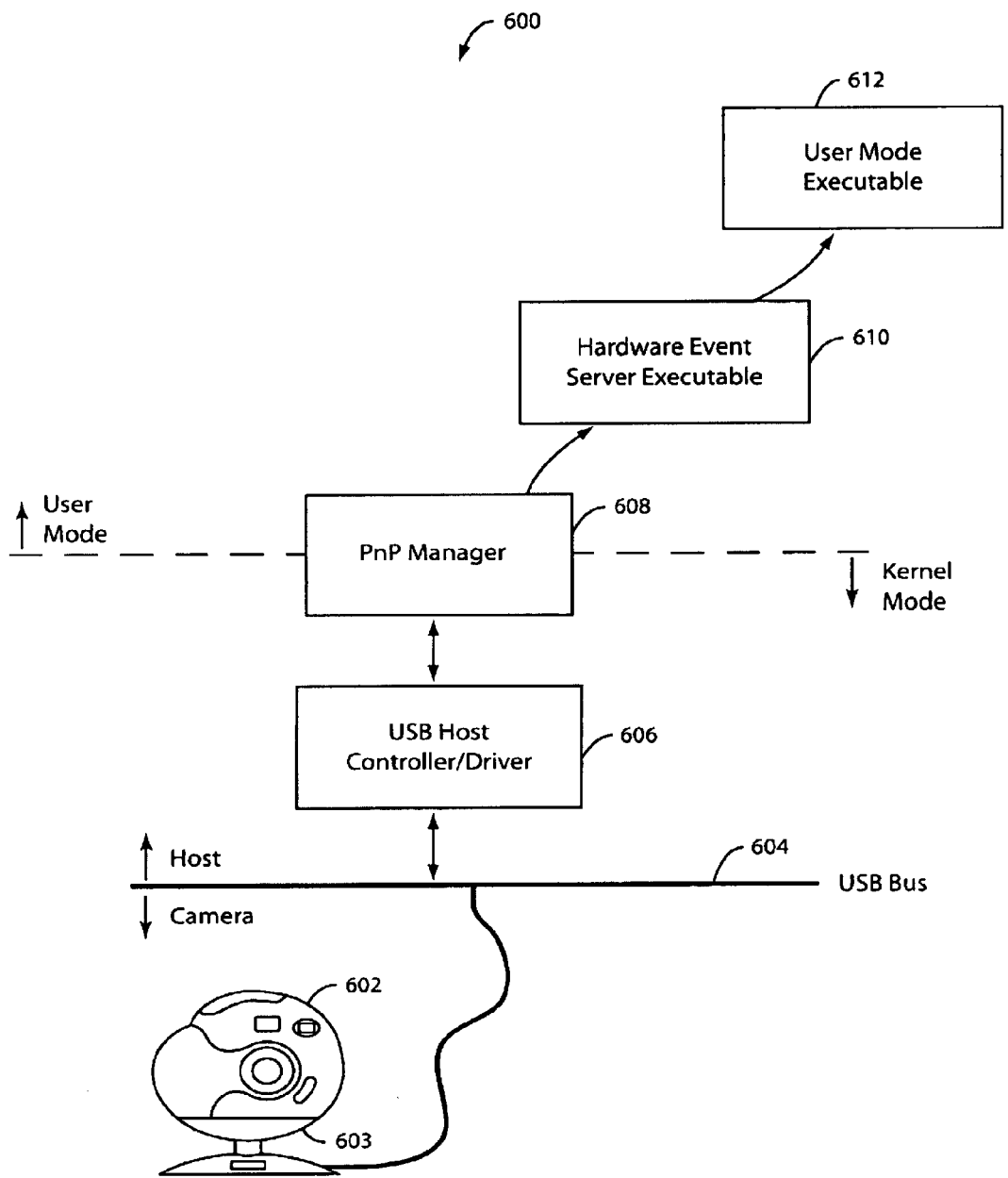
FIG. 6 is a logical block diagram of the operation of an embodiment of the data transfer system where a host executable program receives a device arrival notification message.

Having completed the image selection and action assignments, the operator next connects the camera to the camera base unit (step 504). Connecting the camera to the base unit causes the USB host controller and/or driver to recognize the presence of the camera device on the bus. FIG. 6 is a logical block diagram 600 of the operation of an embodiment of the data transfer system where a host executable program receives a device arrival notification message. The host executable program (i.e. user mode executable) is the software portion that is configured to carry out the transfer of data between the camera and the host.

As shown in FIG. 6, connecting the camera 602 to the base unit 603, which effectively connects the camera with the USB bus 604, causes the USB host controller or driver 606 to recognize the presence of the camera device 602 on the bus 604 and query the device 602 for a product identification (PID) and vendor identification (VID), which in one embodiment are stored on the camera memory. The USB host controller/driver 606 passes the PID and VID to the kernel mode plug and play manager (PnP manager) 608, which in turn passes control to user mode PnP manager 608. The PnP manager 608 loads operating system driver files that inspect operating system information files on the host to locate appropriate device driver files for the camera device based on the PID-VID. Once the PnP manager 608 has completed the loading of the operating system driver files, control is passed back to the kernel mode PnP manager 608 which loads device driver files and the hardware event server executable 610. The hardware event server executable is a software program that passes hardware events such as device connections and button clicks to the user mode executable 612. Next, the PnP manager sends the device arrival notification message to the hardware event server executable 610. The hardware event server executable 610 then responds by launching the host user mode executable 612 (step 506).

Figure 7:
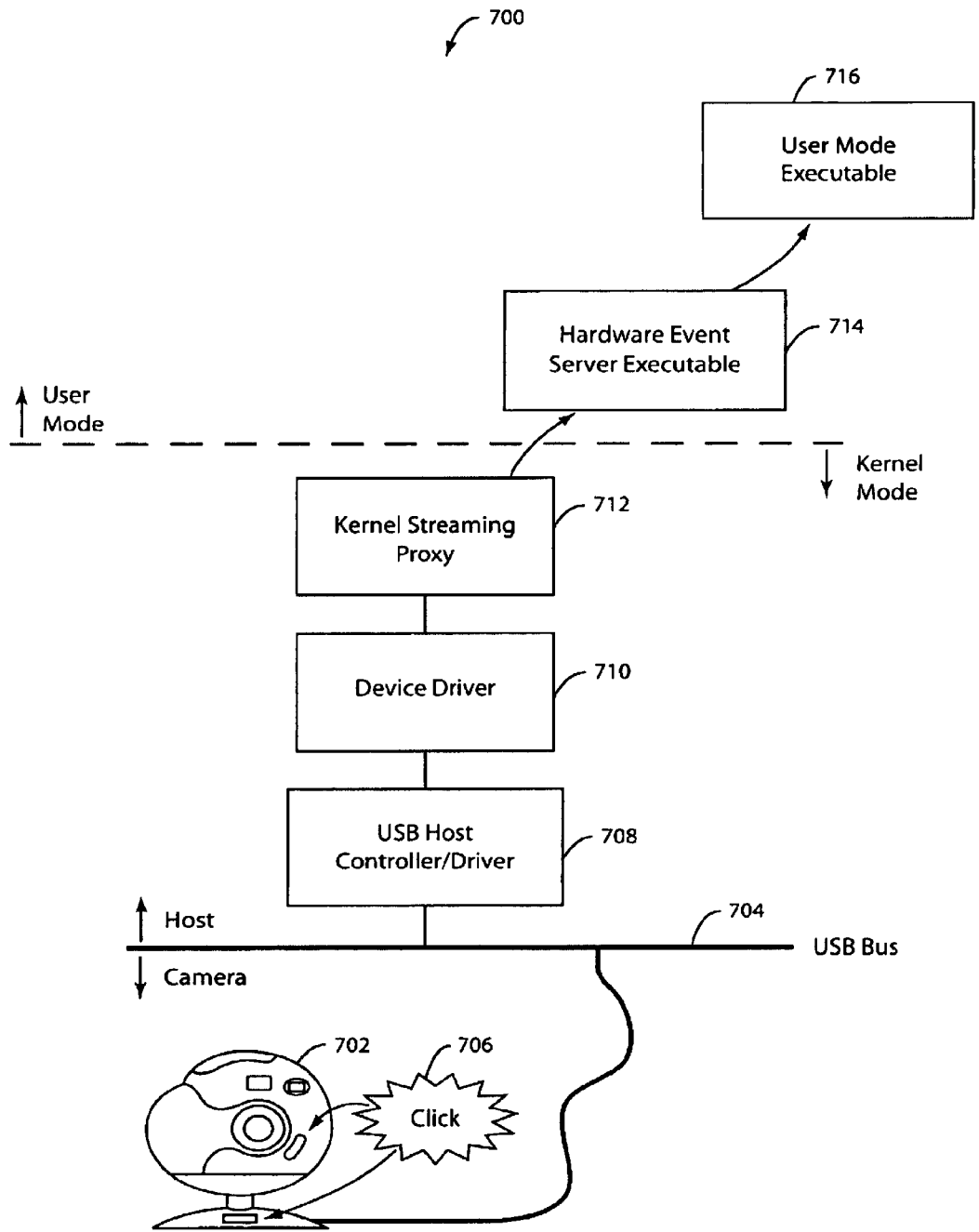
FIG. 7 is a logical block diagram of the operation of an embodiment of the data transfer system where a host executable program recognizes and responds to a button click.

At the end of this step (step 506), the camera has established an interface with the host, and the connection is recognized by the camera and the host. As described above, this recognition may include the activation of an LED to illuminate the "quick send" button to indicate to the operator that the camera is ready to transfer the selected data to the host. Next, the operator initiates the transfer of data from the camera to the host by activating the "quick send" button (step 508). FIG. 7 is a logical block diagram 700 of the operation of an embodiment of the data transfer system where a host executable program (user mode executable) recognizes and responds to a button click.

Inherent in the description of events shown in FIG. 7 is that various software components have already been loaded at the host through an application install as described above. In addition, the application install causes the hardware event server to be registered with an operating system-level event definition program, which in the context of this example is referred to as the Kernel Streaming Proxy (KSP) component of the operating system. With the camera 702 connected with the bus 704, the operator will activate the "quick send" button 706 to initiate the transfer of data (selected images with assigned actions) from a camera to a host. The camera (or camera base) button-push operations get passed to the KSP component 712 through a USB host controller/driver 708 (i.e. same as 606 on FIG. 6) and the camera device driver 710. The KSP 712 sends the button "click" event to the hardware event server 714 (i.e. same as 610 on FIG. 6). The hardware event server 714 responds by launching the host user mode executable 716 (step 510). The user mode executable is the executable program that carries out the bulk of the data transfer operations between the camera and the host.

In one embodiments, the launching of the user mode executable (step 510) spawns further operations which will cause the user mode executable to build an image-action list (step 512) and then process the actions on the image action list (step 514). The building of the image-action list (step 512), in turn includes an inspection of the images files and the data associated with each image stored on the camera to build a list of related actions for the transfer of the image data. The inspection of the image files and associated data is carried out by a proprietary device driver interface. Alternately, the camera can identify itself to the host as a mass storage device (e.g. a USB device), which can then be browsed by the host's operating system. Yet alternately, the inspection of the image files and the associated data takes place in the host application software after it has downloaded the data from the camera along with the image files. At the end of this inspection step, the user mode host executable builds an "image-action" list that is a list of image files and associated transfer actions to carry out.

Next, the user mode host executable processes the image-action list (step 514). The processing which is predominantly directed to a transfer of data from the camera to the local host can encompass several operations, which include: (1) downloading images and associated data to the intelligent host; (2) combining multiple images associated with a similar operation or destination for more efficient processing; (3) image compression and/or reformatting for the remote host or electronic mail delivery; (4) creating additional copies of an image; (5) adding trailers or animated wrappers around images; (6) authentication with remote host sites; (7) input of further information from the operator, such as an electronic mail message; (8) automatic generation of an electronic mail message; (9) uploading of images and data to a remote site and (10) launching a URL of a web site on the local host.

In alternate embodiments, the user mode executable automatically processes the image action list to transfer data without requiring the operator to click the "quick synch" button. This automatic transfer is initiated and carried out once the interfacing of the camera with the host has been recognized by the camera and the host.

Another aspect of the operation of the user mode executable is the capability of providing for a bi-directional communication between the camera and the local or remote host. This bi-directional aspect enables the flow of data from a local or remote host back to the camera. This bi-directional aspect provides a significant improvement over systems and methods that transfer data from a digital camera to a local or remote host, by enabling the on-camera memory to be updated with relevant information from the local or remote host. This information includes file directory names on a local or remote host that an operator has created for storing the data from the camera, and which were previously not available on the on-camera list for the operator to select therefrom. This backward flow of data allows for the camera to be uploaded with the most current list of file directory locations, web folder locations, instant messenger IDs and/or addresses, or more generally Universal Resource Locators (URLs), for the transfer of data out of the camera, so that the camera and the operator are enabled to choose from options, which were not previously available on the camera. As described above, one of the data types that a user can associate with a selected image file is a file directory location selected from an on-camera list to receive the transferred on-camera image file. The bi-directional feature of the user mode executable, by sending data from the local or remote host to the camera, enables the operator to choose from a list of file directory locations that is updated to reflect the most currently available file directory locations on a local or remote host.

Other data types that are also transferred from a local or remote host back to the camera include electronic mail addressees, as well web property identification information and others as described above. The data being transferred from a local or remote host is passed back to the user mode executable in response to a query from the user mode executable. The user mode executable then sends the data back to the camera device via the same interface described above. The camera device then stores the transferred data on the camera's fixed or removable memory.

Another alternate embodiment of the method of the present invention enables the transfer of data between a camera and a host that is not connected with a camera base unit, or a host that has not previously interfaced with the camera. This alternate embodiment has utility when the operator is at a location where the operator's local host is not available, as in when the operator is on a trip away from home but has access to another host. In this embodiment, once the camera is directly connected to the host (e.g. via a USB connection), the camera identifies itself to the host's operating system as a USB mass storage device. The host USB controller/driver then loads a default USB mass storage device driver and mounts a drive for the camera as a storage device. Upon inspecting a file allocation table on the camera the host's operating system opens an "autorun" information file and loads and runs the executable specified in the "autorun" information file, which resides on the camera's memory. As specified above, the executable program performs the functions of the user mode executable directly, or by launching the default browser on the host to a URL, which automatically downloads more software to accomplish the data transfer tasks.

Another advantage of the bi-directional data transfer enabled by the host executable is expressed in an alternate embodiment where the camera identifies itself as a USB mass storage device. In this alternate embodiment, with the camera connected to a host, an operator is enabled to copy an image file to the camera, since the camera is recognized as a mass storage device like any other storage device. The camera's LCD is then used to display the transferred image file, and in a sense the camera becomes a versatile and portable digital frame.

As will be understood by those of skill in the art, the present invention may be embodied in other specific forms without departing from the essential characteristics thereof. For example, the "quick send" button may be either implemented as a part of the dual camera or as a part of the camera base unit (cradle), or that the transfer of data from the peripheral device to the intelligent host may be initiated as an automated process without requiring a manual button click, via a tethered or wireless connection. Accordingly, the foregoing disclosure is intended to be illustrative, but not limiting, of the scope of the invention, which is set forth in the following claims.

What is claimed is:

1. A camera system for transfering data between a camera and an intelligent host, said system comprising:

a camera configured to capture one or more images and store image data corresponding to said images in a memory of said camera;

a cradle configured to receive said camera and provide a communication interface between said camera and said intelligent host;

a one-button device configured to cause a transfer of said image data from said camera to said host; and a computer useable medium having computer readable cod embodied therein for causing the interfacing of said camera with said intelligent host, said computer readable code further comprising:

(i) an interface recognizing code portion configured to cause said camera to recognize its interface with said cradle;

(ii) an interfacing code portion configured to cause said camera to interface with said intelligent host;

(iii) an external storage recognizing code portion configured to cause said camera to recognize a storage location on said intelligent host;

(iv) a data transferring code portion configured to cause a transfer of data between said camera and said storage location, wherein said system is configured to transfer said image data stored on said camera to said host once said camera is docked onto said cradle and establishes a communication link between said camera and said host.

2. The system of claim 1 wherein said cradle is interfaced with said intelligent host via a wireless connection.

3. The system of claim 1 wherein said cradle is interfaced with said intelligent host via tethered connection.

4. The system of claim 1 wherein said image data are transferred to said host automatically once said camera is connected to said cradle.

5. The system of claim 1 wherein all data stored on said camera is transferred to said host, said transfer of all data from said camera to said host occurs in response to activating said one-button device after said camera is connected to said cradle.

6. The system of claim 1 wherein said image data including first data that represents a first image, said first data being associated with a first selected action that is to be performed by said host after receiving said firs data from said camera.

7. The system of claim 1 wherein said camera comprises a dual mode digital camera having at least a first mode and a second mode of operation, wherein in said first mode said camera is a digital still camera, and in said second mode, said camera is a digital video camera.

8. The system of claim 1 wherein said intelligent host is selected from the group consisting of a personal computer, a handheld computer, interactive set-top box, a thin client computing device, a personal access device, a cellular telephone, an internet appliance, an internet connected digital picture frame and combinations thereof.

9. The system of claim 1 wherein said interface recognizing code portion further comprises routines for providing a visual indication to an operator to indicate that an interface between said camera and said host is established.

10. The system of claim 1 wherein said data transferring code portion is configured to transfer data in at least a first mode and a second mode, wherein in said first mode, said data transferring code portion causes a transfer of said data from said camera to said intelligent host, and wherein in said second mode, said data transferring code portion causes a transfer of data from said intelligent host to said camera.

11. The system of claim 1 wherein said one-button device is a part of said camera.

12. The system of claim 1 wherein said one-button device is a part of said cradle.

13. The system of claim 6 wherein said image data including second data that represents a second image, said second data being associated with a second selected action that is to be performed by said host after receiving said second data from said camera, said second selected action being different than said first selected action.

14. The system of claim 9 wherein said visual indication is provided by a light emitting diode (LED), wherein said LED is activated upon recognizing that an interface between said camera and said intelligent host is established.

15. The system of claim 13 wherein said data transferred from said camera to said host includes second data that represents a second image, said second data being associated with a second selected action that is to be performed by said host after receiving said second data from said camera, said second selected action being different than said first selected action.

16. The system of claim 1 wherein said cradle further comprises:

a base;

a pedestal connected with said base and configured to be connected with said camera, and having means for guiding the connection of said camera and said pedestal;

a pedestal connector connected with said pedestal and configured to be connected with said camera; and a cable having a near end configured to be connected with said pedestal connector, and said cable having a far end configured to be connected with a far-end connector, wherein said cable is passed through said cradle so as to be connectable with a camera at its near end, and capable of interfacing with an intelligent host a its far end.

17. The system of claim 16 wherein said pedestal is rotatably connected with said base.

18. The system of claim 16 wherein said cable is a USB cable, and wherein said cable's far-end connector is a USB connector, and wherein said near end connector is a mini USB connector.

19. A method of transferring data between a camera and an intelligent host, said method comprising:

connecting a cradle to an intelligent host, said cradle being configured to enable a camera to be docked or undocked to said cradle;

connecting said camera to said cradle by docking said camera to said cradle, said cradle providing a communication interface between said camera and said intelligent host;

transferring data between said camera and said intelligent host;

initializing said camera, wherein said initializing further comprises, recognizing a connection between said camera and said intelligent host;

interfacing said camera with said intelligent host; and recognizing by said camera a storage location on said intelligent host, wherein said transferring comprises transferring all data from said camera to said host.

20. The method of claim 19 wherein said transferring occurs automatically once said camera is connected to said cradle.

21. The method of claim 19 wherein said transferring occurs in response to activating a one-button device.

22. The method of claim 19 wherein said camera comprises a digital camera having at least a first mode and a second mode of operation, wherein in said first mode said camera is a digital still camera, and in said second ode, said camera is a digital video camera.

23. The method of claim 19 wherein said cradle further comprises:
   a base;
   a pedestal connected with said base and configured to be connected with said camera;
   a pedestal connector connected with said pedestal and configured to be connected with said camera; and
   a cable having a near end configured to be connected with said pedestal connector,
   and said cable having a far end configured to be connected with a far-end connector,
   wherein said cable is passed through said cradle so as to be connectable with a camera at its near end, and capable of interfacing with an intelligent host at its far end.

24. The method of claim 19 wherein said intelligent host is selected from the group consisting of a personal computer, a handheld computer, an interactive set-top box, a thin client computing device, a personal access device, a cellular telephone, an internet appliance and an internet connected digital picture frame.

25. The method of claim 19 wherein said transferring data between said camera and said storage location on said intelligent host is configured to transfer data in at least a first mode and a second mode,
   wherein in said first mode, said data transferring is from said camera to said intelligent host, and
   wherein in said second mode, said data transferring is from said intelligent host to said camera.

26. The method of claim 19 wherein said data transferred from said camera to said host includes first data that represents a first image, said first data being associated with a first selected action that is to be performed by said host after receiving said first data from said camera.

27. The method of claim 21 wherein said one-button device is a part of one of said camera and said cradle.

* * * * *

UNITED STATES PATENT AND TRADEMARK OFFICE
CERTIFICATE OF CORRECTION

PATENT NO. : 6,944,700 B2  Page 1 of 1
APPLICATION NO. : 09/882533
DATED : September 13, 2005
INVENTOR(S) : Bateman et al.

It is certified that error appears in the above-identified patent and that said Letters Patent is hereby corrected as shown below:

In Claim 1 (column 10, line 60) correct "transfering" to "transferring"

In Claim 1 (column 11, line 4) correct "cod" to "code"

In claim 6 (column 11, line 37) correct "firs" to "first"

Signed and Sealed this

Twenty-second Day of August, 2006

JON W. DUDAS
*Director of the United States Patent and Trademark Office*